March 15, 1927.  J. JAMES  1,621,413
FILTERING DEVICE
Filed Sept. 18, 1925
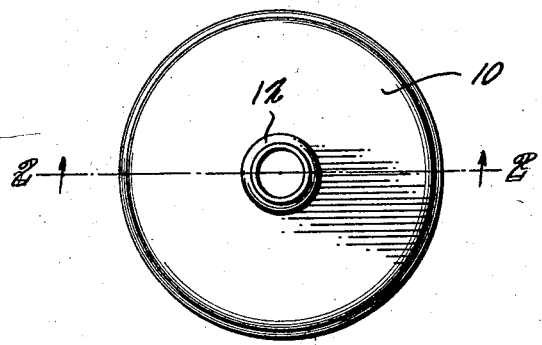
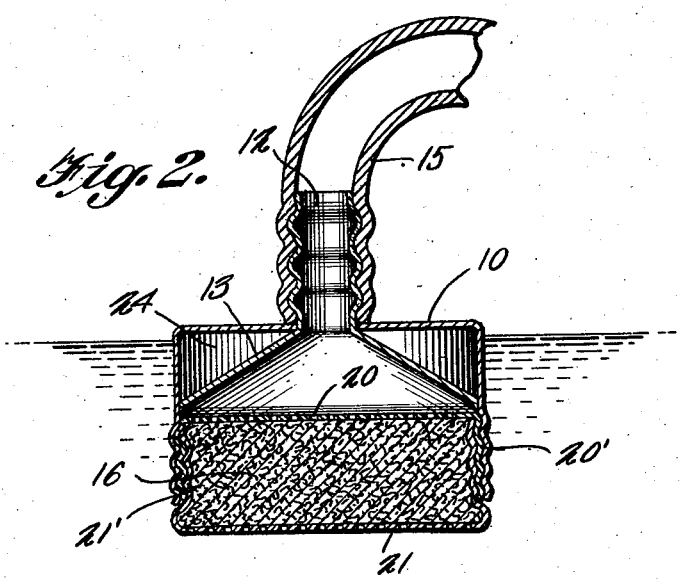
Joe James, INVENTOR
BY Victor J. Evans
ATTORNEY
WITNESS:

Patented Mar. 15, 1927.

1,621,413

UNITED STATES PATENT OFFICE.

JOE JAMES, OF BROWNWOOD, MISSOURI.

FILTERING DEVICE.

Application filed September 18, 1925. Serial No. 57,167.

The object of this invention is to provide a filtering device adapted to float near the surface of a body of liquid in a receptacle, said device including a suction connection, so that liquid may be drawn upwardly through a filtering medium, within the float and conveyed to a point of discharge.

A further object is to provide a device of the type indicated, adapted to withdraw liquid from a receptacle for the purpose of placing it in bottles or the like, the liquid flowing from a point near the surface so that any sediment in the bottom of the receptacle may not be disturbed.

With the foregoing and other objects in view, the invention consists in the novel construction and arrangement of elements described, illustrated and claimed, it being understood that modifications may be made within the scope of the claims without departing from the spirit of the invention.

In the drawings forming part of this application:—

Figure 1 is a plan view of the device detached from the suction tube with which it is to be employed.

Figure 2 shows the device and a portion of the suction tube, in vertical section, the section being on line 2—2 of Figure 1.

The float includes the hollow body or shell 10 having an upper central opening through which the tubular portion 12 of inverted funnel member 13 extends.

The element 13 is suitably secured to the inner wall of shell 10, and the portion 12 is provided with annular devices for effecting air tight connection with flexible tube 15, through which air is withdrawn from the float chamber.

A filtering medium 16 is contained within a receptacle including upper and lower perforated plates or walls 20 and 21, the side walls of these elements being designated 20' and 21' and having threaded connection, or other suitable form of connection with each other. Wall 20' is adapted for threaded connection with the threaded side portion of casing 10.

An air chamber 24 is of sufficient size to maintain the device, or a portion thereof below the upper surface of the liquid, which may, therefore, be drawn off through the body of filtering material, and through tube 15, under reduced air pressure, without disturbing the sediment or other foreign material at the bottom of the receptacle containing the liquid to be bottled or otherwise disposed of.

Having described the invention, what I claim is:—

1. A device of the class described, comprising a shell, a funnel-shaped element positioned within the upper portion of the shell and forming therewith an air chamber, means for producing a box like receptacle within the shell below the edge of the funnel, and filtering material within this receptacle.

2. A device of the class described, comprising a shell, a funnel-shaped element positioned within the upper portion of the shell and forming therewith an air chamber, inter-engaging devices for producing a box like receptacle within the shell below the edge of the funnel, and filtering material within this receptacle.

3. A device of the class described, comprising a shell, a funnel-shaped element positioned within the upper portion of the shell and forming therewith an air chamber, inter-engaging devices for producing a box like receptacle within the shell below the edge of the funnel, and filtering material within this receptacle, one of said inter-engaging devices having detachable connection with the shell.

In testimony whereof I affix my signature.

JOE JAMES.